May 18, 1937. H. J. BLAKESLEE 2,081,100
METER CONNECTION BLOCK
Filed Feb. 14, 1936
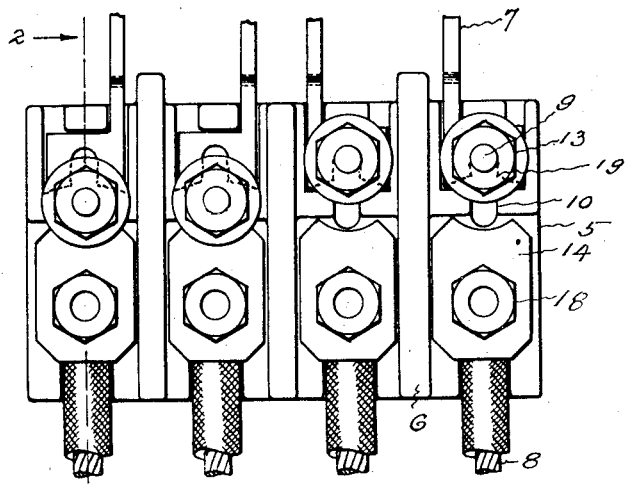
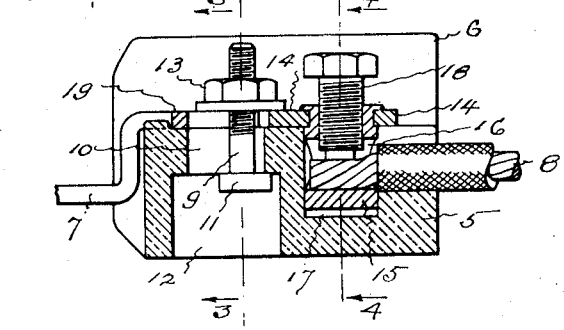
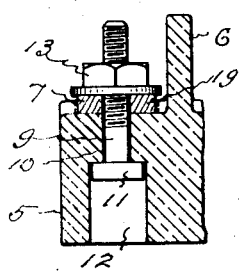
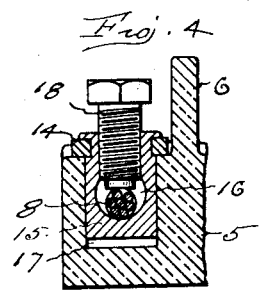
INVENTOR
Henry J. Blakeslee
by Harry P. Williams
atty.

UNITED STATES PATENT OFFICE 2,081,100

METER CONNECTION BLOCK

Henry J. Blakeslee, Marlboro, Conn., assignor to The States Company, Hartford, Conn., a corporation of Connecticut Application February 14, 1936, Serial No. 63,877

7 Claims. (Cl. 200—163)

This invention relates to those blocks which are interposed between the terminals of electric circuits and meters that are connected for measuring the loads in the circuits, and more particularly to those blocks that have means for opening the circuits and for facilitating tests of the meters, which blocks are usually enclosed in service channels, boxes or cabinets.

The object of the invention is the production of a block of the character mentioned that has few parts, which parts are cheap to manufacture, assemble and connect, and which can be easily and quickly manipulated for testing purposes or for completely disconnecting the meter from the circuit and cutting off the service.

In the accompanying drawing Fig. 1 shows a front view of a two wire block that embodies the invention, with two of the circuit paths closed and two opened, circuit terminals and meter leads being indicated.

Fig. 2 is a sectional view on the plane denoted by the dotted line 2—2 on Fig. 1.

Fig. 3 is a section on the plane denoted by the dotted line 3—3 on Fig. 2.

Fig. 4 is a section on the plane denoted by the dotted line 4—4 on Fig. 2.

The base 5 of the block may be made of any suitable material, preferably porcelain. The base may have any desired number of current paths, four being illustrated as separated by insulating barriers 6. At the upper end of each path are conducting means for the connection of meter leads 7, and at the lower end of each path are conducting means for the connection of the terminals of circuit wires 8.

The conducting means at the upper or meter end of each current path comprises a bolt with its shank 9 extending through a slot 10 in the base and with its head 11 retained in a recess 12 in the under side of the base. On the threaded outer end of the bolt shank is a nut 13. The slot and recess are so elongated that when the nut is loosened the bolt and nut may be moved longitudinally with relation to the current path across the base.

The conducting means at the lower or circuit terminal end of each current path comprises a plate 14 secured to a binding post 15 which has an opening 16 for the entrance of a circuit terminal. The binding post is set in a recess 17 in the base and threaded into the outer end of the post is a binding stud 18 for clamping the circuit terminal 8.

The forked end 19 of each meter lead 7 is set in a depression in the front face of the base beneath the nut 13. With the nut moved to its lower position and tightened, as illustrated on the left of Fig. 1, it clamps both the forked end of the meter lead 7 to the base and also the plate 14 to the base, and closes the current path from the terminal to the meter lead. When the nut is moved to its upper position and tightened the meter lead is clamped to the base but with the current path opened, as shown on the right of Fig. 1.

In the construction described the current paths across the blocks are opened and closed, as desired, by the bolts and nuts which clamp the meter leads, no separate means are used for securing the ends of the meter leads, which reduces the cost of material and labor of assembly of the block parts and simplifies the attachment of the meter leads to the block, as well as facilitating the manipulation of the connections for testing purposes.

As shown and described the bolt head is within the base and the nut is screwed on the outer end of the bolt for connecting and clamping the conductors. It is obvious, however, and is within the scope of the invention, that the nut could be located within the base and the bolt screwed into the nut so that the bolt head rather than the nut would be the means for opening and closing the circuit and clamping the conductors to the base.

The invention claimed is:

1. A meter connection block comprising a base with conducting means for the connection of a circuit terminal, mounted on the base, a meter lead with an end aligned with but spaced from an end of said conducting means, and a conducting clamp slidably attached to the base, said clamp being slidable along the base across said space into and out of contact with said terminal connection means and adapted to when in contact and when out of contact with said terminal connection means clamp the meter lead to the base.

2. A meter connection block comprising a base with conducting means for the connection of a circuit terminal, mounted on the base, and switching means slidably attached to the base, said switching means in one position of its sliding movement being adapted to engage and clamp a meter lead only to the base and in another position of its sliding movement being adapted to electrically connect and to clamp both a meter lead and the terminal conduction means to the base.

3. A meter connection block comprising a base with conducting means for the attachment of a circuit terminal, a meter lead and switching means securing said meter lead to the base, said switching means being slidably secured to the base and slidable into and out of engagement with said current terminal attachment means for closing and opening a current path between said attachment means and the meter lead.

4. A meter connection block having a base with conducting means for the connection of a circuit terminal mounted on the base, and switching means slidably attached to the base, said switching means comprising a bolt and nut slidable along a slot in the base into and out of contact with said terminal connection means.

5. A meter connection block having a base with a current path which comprises conducting means for the connection of a circuit terminal, a meter terminal, and a bolt and nut slidably attached to the base, said nut with the bolt in one position adapted to electrically connect and to bind said conducting means and said meter terminal to the base, and with the bolt in another position adapted to electrically disconnect said conducting means and the meter terminal and to bind the meter terminal only to the base.

6. A meter connection block comprising a base, conducting means for the connection of a circuit terminal mounted on the base, a meter terminal mounted on the base, and a bolt and nut slidably attached to the base, said bolt and nut in one position of their movement adapted to electrically connect said conducting means and the meter terminal and secure the meter terminal to the base, and in another position of their movement to electrically disconnect said conducting means and meter terminal and secure the meter terminal to the base.

7. A meter connection block comprising a base, two conductors mounted on the base with their ends aligned but spaced from each other, and a bolt and nut clamp slidably attached to the base and slidable along the base across said space, said clamp in one position electrically connecting and clamping the ends of said conductors to the base, and in another position electrically disconnecting the ends of said conductors and clamping but one conductor to the base.

HENRY J. BLAKESLEE.